United States Patent [19]

Overhulser

[11] Patent Number: 5,911,483
[45] Date of Patent: Jun. 15, 1999

[54] TOWED - TOWING VEHICLE BRAKING WITH AUTOMATIC EMERGENCY BRAKING

[76] Inventor: William T. Overhulser, 275 Lake Francis Rd., Lake Placid, Fla. 33852

[21] Appl. No.: 08/767,668

[22] Filed: Dec. 17, 1996

[51] Int. Cl.[6] ............................................. B60T 13/00
[52] U.S. Cl. ............................................. 303/7; 188/3 H
[58] Field of Search .................... 303/9, 9.63, 15, 303/17, 7; 280/428; 188/3 H, 112 R

[56] References Cited

U.S. PATENT DOCUMENTS

| | | | |
|---|---|---|---|
| 3,774,975 | 11/1973 | Schmidt | 303/7 |
| 5,031,729 | 7/1991 | Wittkop et al. | 188/3 H |
| 5,411,321 | 5/1995 | Harness | 303/7 |
| 5,431,253 | 7/1995 | Hargrove | 188/3 H |
| 5,678,664 | 10/1997 | Marasco | 188/112 R |

*Primary Examiner*—Robert J. Oberleitner
*Assistant Examiner*—Melanie Talavera

[57] ABSTRACT

A system that allows a driver of a towing vehicle to control self contained brakes of towed vehicle thorough application of towing vehicle brakes. When driver applies towing vehicle brakes and brake light switch is activated a solenoid in conjunction with compressor and air tank in towed vehicle releases air pressure to an air cylinder depressing towed vehicle's brake pedal. If the towed vehicle detaches from towing vehicle while traveling a second solenoid will be activated by a breakaway switch to bring the towed vehicle to a rapid stop.

2 Claims, 3 Drawing Sheets

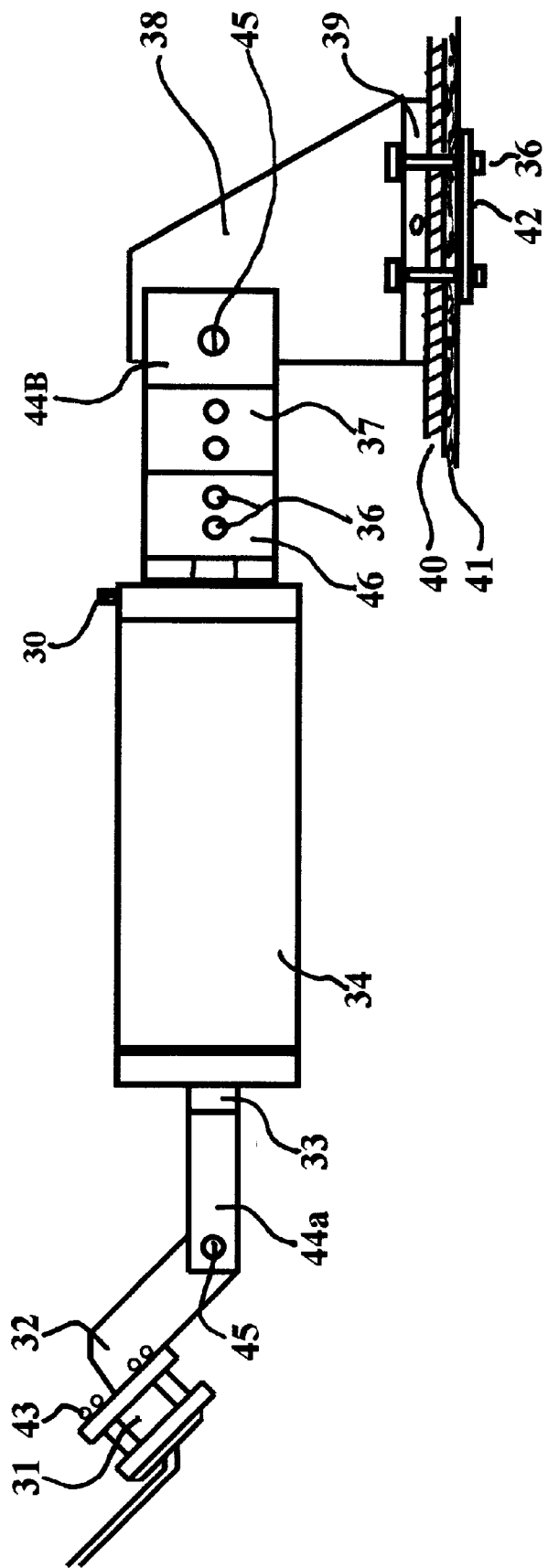

TOWED - TOWING VEHICLE BRAKING WITH AUTOMATIC EMERGENCY BRAKING

FIELD OF INVENTION

This invention provides a means to control self contained brakes of a towed motor vehicle behind a motor home or other towing vehicle. When towing driver applies towing vehicle brakes, brakes on towed vehicle will also apply. This invention will also automatically apply towed vehicle brakes in an emergency situation if towed vehicle accidentally separates from a towing vehicle while traveling on a roadway. This invention accomplishes these two functions without modifications to D.O.T. approved brake systems of either vehicle.

BACKGROUND OF INVENTION

Most jurisdictions require operating brakes on towed vehicles if, when they are towed, they exceed certain weight limits. On our highways are hundreds of vehicles towing some kind of transportation vehicle used at destinations when towing vehicle is parked. Most of these towed vehicles exceed weight limits set by manufactures of motor homes in addition to state regulations, if self contained brakes are not operable when being towed.

Fines of up to $200 have been levied in Canada for not having brakes operating on a towed vehicle. They are also requiring operable emergency brakes as well. They require a towed vehicle not equipped properly to be disconnected and parked or driven while in Canada until terms of ordinance are complied with. (Trailer Life magazine article by Chuck Campbell November 96). Though our states are not yet enforcing operating brakes regulations for towed vehicles over specified weights the regulations are in place. Enforcement could begin anytime.

There are several patents intended to solve this problem. Some, however, are quite expensive and could not be easily installed by an owner, likely requiring an experienced mechanic's services. Several also require modifications of both towing and towed vehicle's D.O.T. approved brake systems. Those that depend on "surge action" (pushing movement of towed vehicle) are not recognized by the AMERICAN ASSOCIATION OF MOTOR VEHICLE ADMINISTRATION (a government agency that approves all brake systems in commercial use). Surge brakes are not allowed by Code 393.48a Federal Safety Regulation in B and C and are not permitted in commercial use. Surge brakes are not yet regulated for RVs.

Although the AMERICAN ASSOCIATION does not condemn modifications of brake systems, (they frown), they are concerned that extended lines and connections added to vehicles may cause contamination, e.g., air, moisture, or dirt to enter such systems. If one of these systems has a line fracture there would likely be a complete failure of both vehicle's system. A dependable assist system is needed that does not require changes in vacuum, hydraulic, or air lines of either vehicle. Such a system should provide emergency braking if a towed vehicle separates from towing vehicle. This invention will resolve both situations.

A patent search revealed the existence of several systems to assist towed vehicle braking;

U.S. Pat. No. 5,431,253 operates through an extended vacuum line.

U.S. Pat. No. 4,635,758 depends on an extended hydraulic line.

U.S. Pat. No. 4,174,869 has an interconnected hydraulic line.

U.S. Pat. No. 4,398,771 has vacuum line changes and added bellows.

U.S. Pat. No. 5,246,243 depends on a surge brake cylinder.

U.S. Pat. No. 5,411,331 depends on towed vehicle battery power to maintain air pressure. It also may use a radio signal or driver operated switch.

U.S. Pat. No. 4,280,737 has complicated electrohydraulic system.

U.S. Pat. No. 5,000,519 is complicated by several switches for driver to remember.

These patents listed and others not listed are making modifications to D.O.T. approved brake systems. Though there are apparently no regulations restricting modifications, if a problem develops that is associated with some modification, someone could get into very serious litigation if a modified system fails and is proven to have caused an accident or serious injuries. It is quite possible that during connecting and disconnecting, contamination, moisture, dirt, air, could enter lines that are altered to adapt to these brake systems.

Some systems depend on radio signals, switches for a driver to decipher, a battery of a towed vehicle that could discharge while keeping an air compressor operating for a long driving period, or a suspended vacuum, air, or hydraulic line not rupturing. A ruptured line would cause complete failure of both vehicle's brake systems. A discharged battery could render a system useless without towing driver's knowledge.

BRIEF SUMMARY OF THIS INVENTION

The object of this invention will become apparent, to provide braking assistance for a towing vehicle and automatic emergency braking for a towed vehicle by reference detailed in FIG. 1, FIG. 2 and FIG. 3.

This invention is portable, self contained, and light weight (under 15 pounds).

This invention will;

1. eliminate any need for modifications to any part of any original D.O.T. approved brake system in towing or towed vehicles.
2. not depend on radio signals, servo motors, encoders, switches for a driver to decipher or special electronics.
3. will not discharge the towed vehicle battery by cycling an air compressor many times during a long day's drive.
4. not be difficult for owner installation.
5. not be as expensive, according to figures quoted for other systems.
6. In addition automatic emergency braking will occur in the towed vehicle if towing and towed vehicles are separated while traveling on a roadway.

This invention should it fail, will not cause failure of towing or towed vehicle brake systems as it does not modify any vacuum, air or hydraulic lines of either vehicle.

Electrical power for towed vehicle brake system comes through towing vehicle's flexible wiring harness similar to that used on travel trailers. It remains with the towing vehicle when not being used. This harness directs power from towing vehicle's electrical system to a compressor and a solenoid in towed vehicle's brake unit. When towing vehicle's brake is applied, towed vehicle brakes are automatically activated by a solenoid valve admitting air pressure to an air cylinder assembly on towed vehicle's brake pedal.

An added safety feature of this system is to reduce possibility of "jack knifing". This occurs for as soon as brake light circuit of towing vehicle is activated power from the brake light circuit will activate 1s. solenoid. This will also reduce a tendency of a towed vehicle to "dive under" towing vehicle, a very common occurrence when towing without brakes operating on the towed vehicle. This "dive under" tendency tends to lift, however slightly, the rear of towing vehicle and could effect the towing vehicles rear wheels contact with road surface during a panic stop.

The unusual features of this invention's characteristics will be found in claims, however, the drawings display the inventions order and operation to further point to considerably different and substantial improvements over present systems.

BRIEF DESCRIPTION OF THE SEVERAL VIEWS OF THE DRAWINGS

FIG. 3 is a schematic side view of an air cylinder and directly related components used to activate brakes of towed vehicle.

DETAILED DESCRIPTION OF INVENTION

Figure 1:
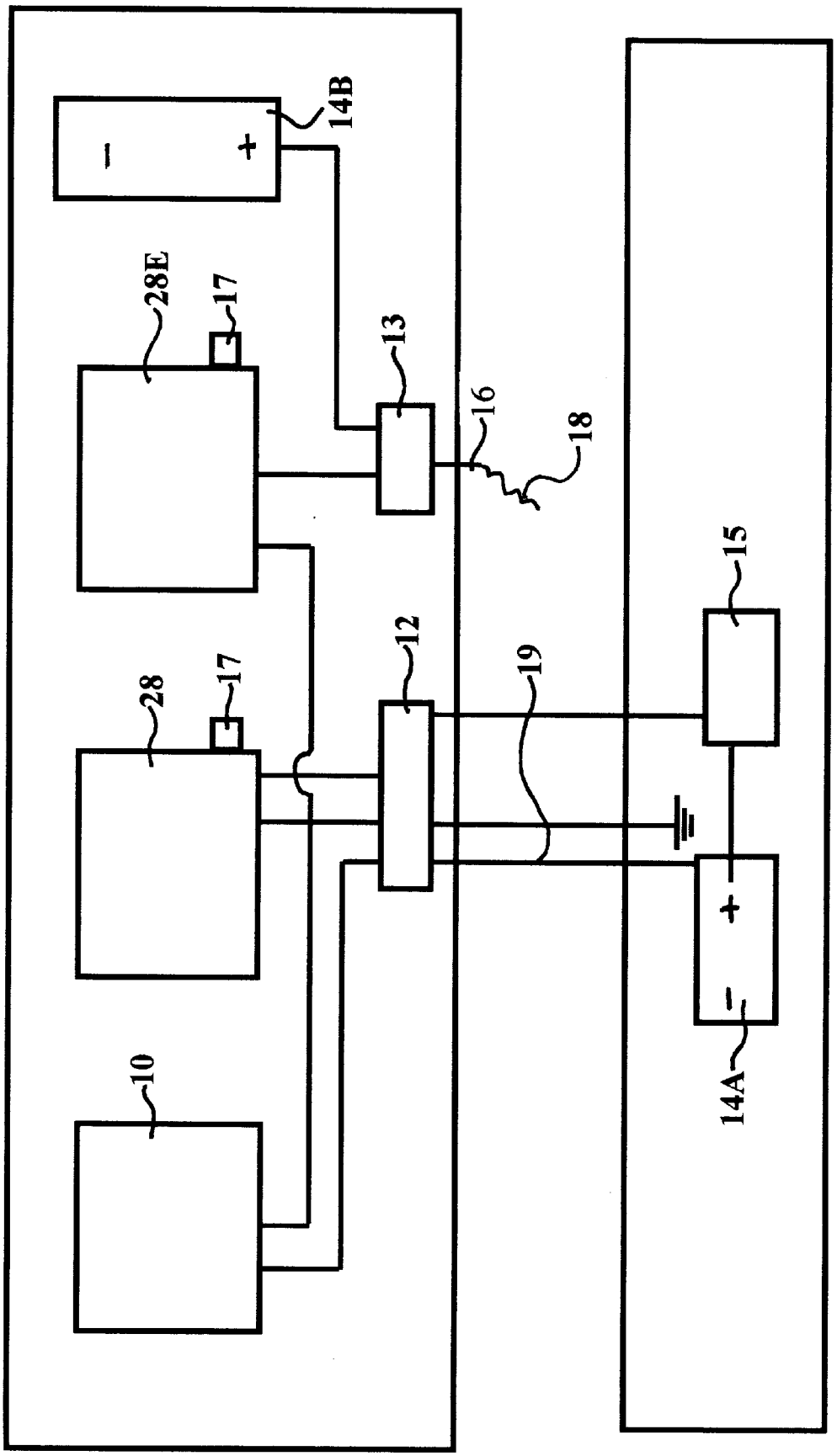
FIG. 1 is a schematic of electrical circuits displaying their relationship involved in towing vehicle and towed vehicle in this invention.
Figure 2:
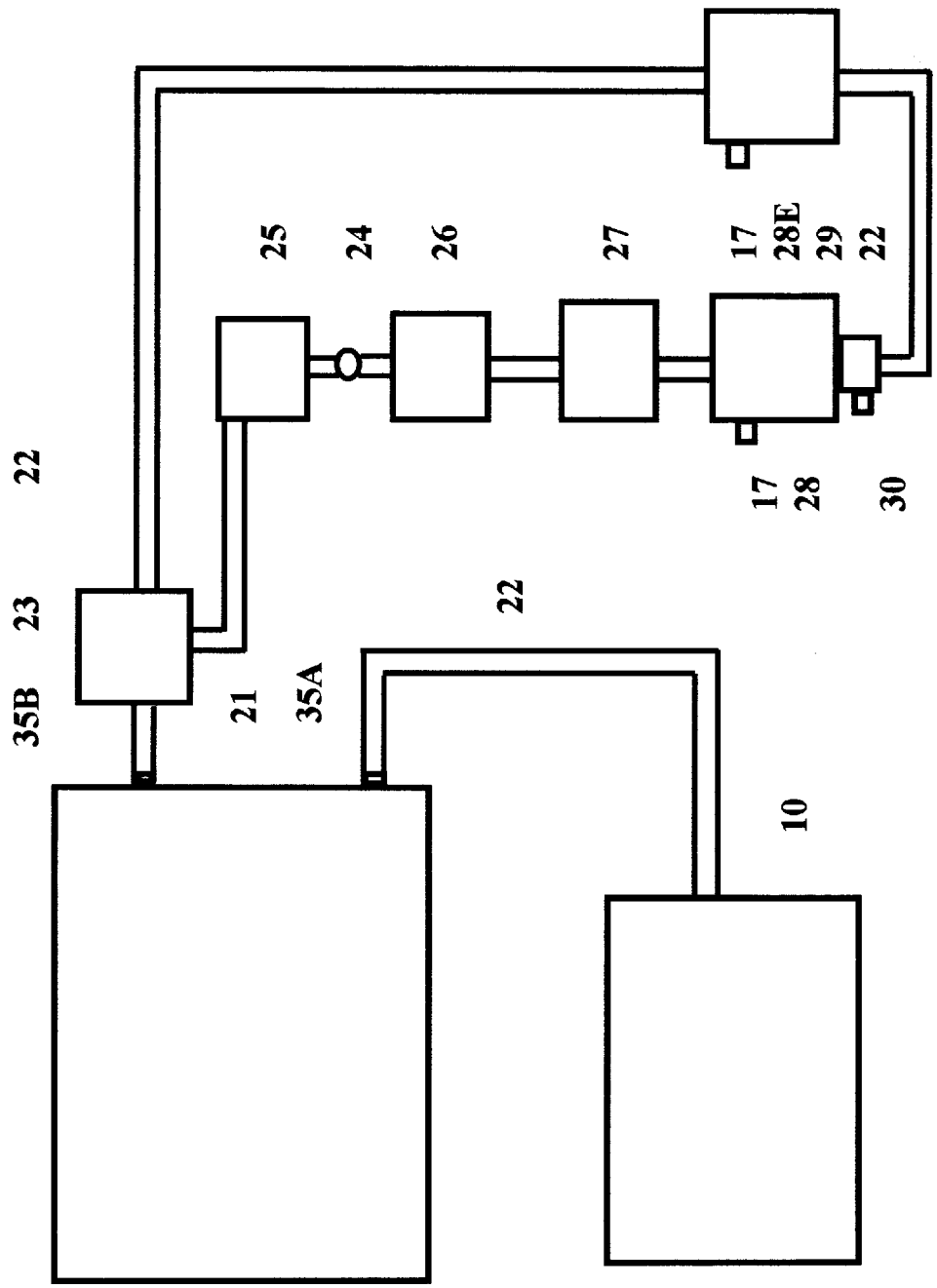
FIG. 2 is a schematic of the compressor, flexible conduit and related components to supply air pressure to components in this invention.

Refer to FIG. 1 through FIG. 3 for elements in specifications. An air compressor 10 is similar to those used to inflate tires, beach equipment etc. Compressor 10 produces about 130 pounds of air pressure. Power for compressor 10 is provided by towing vehicle battery 14A through a power cable 19 attached to rear of towing vehicle and plugged into socket 12 on front of towed vehicle. 1st solenoid 28 is also powered through the same power cable 19 as compressor 10.

1st. 3 way solenoid valve 28 is activated when towing vehicle driver applies brakes of towing vehicle. Activating towing vehicle brake light circuit comprising brake light wiring and switch 15, energized by towing vehicle's electrical system, opens 1st. 3 way solenoid valve 28 allowing air flow from air compressor 10. Air pressure flows through flexible conduit 22,to air pressure tank 21 opening 35a. From air tank 21 exit 35b air pressure flows through manifold 23 to flexible conduit 22 to pressure regulator 25 to which pressure gage 24 is attached. Pressure regulator 25 is set to proper pressure, by reference to pressure gage 24, providing necessary air pressure for normal braking of towed vehicle.

Air pressure from pressure regulator 25 passes to flow control valve 26. Flow control valve 26 manually set and locked, controls the force or speed of air pressure to depress towed vehicle brake pedal 31. Air pressure flows to manually set and locked safety air pressure relief valve 27 at a pressure needed for normal braking. Safety air pressure relief valve 27 will exhaust air pressure to the atmosphere to prevent excessive air pressure to towed vehicle brake pedal 31 if pressure regulator 25 fails. Air pressure enters 1st. solenoid 28 which received power from towing vehicle brake light switch 15, causing it to open, passing air pressure to shuttle valve 29.

Shuttle valve 29 shifts internally according to source of air pressure applied to it. 1st. solenoid 28 when activated by brake light switch 15 has lower air pressure than 2nd. solenoid 28E which receives higher air pressure directly from air tank 21. 2nd. solenoid 28E is activated only in an emergency, 1st. solenoid 28 lower air pressure controls shuttle valve 29 for normal braking. In an emergency 2nd. solenoid 28E will control Shuttle valve 29. Port 30 on shuttle valve 29 is connected by flexible conduit 22 to air cylinder 34 port 30 for both normal and emergency braking depending on which is needed for braking.

Air cylinder 34 internal extendible rod 33 extends to apply pressure to fork 44A attached with removable anchor pin 45 (1 of 3) to pedal bracket 32. Brake pedal bracket 32 is fastened to brake pedal 31 by bolts and wing nuts 43. Pressure is applied to towed vehicle brake pedal 31 providing normal braking. When towing vehicle driver releases towing vehicle brake, brake light switch 15 will stop energizing 1st. solenoid 28. 1st solenoid 28 will close releasing air pressure of air cylinder 34 to the atmosphere from exhaust port 17 on 1st solenoid 28 ceasing application of towed vehicle brakes.

Emergency Braking

During an emergency, (separation of towing vehicle and towed vehicle on a roadway), power cable 19 is disconnected by force of separation stopping power to 1st. solenoid 28. 1st solenoid 28 will release air pressure in air cylinder 34 to the atmosphere from exhaust port 17 on 1st solenoid 28. Breakaway switch 13, powered by towed vehicle battery 14, mounted on front of towed vehicle will close when safety pull pin 16 with steel cable and hook 18 is forcibly removed simultaneously with power cable 19 by separation of vehicles. This cable and hook 18 are temporarily hooked to rear of towing vehicle only when towing. Breakaway switch 13 energizes 2nd. solenoid 28E. Air tank 21 higher air pressure to 2nd. solenoid 28E will by pass all valves through flexible conduit connected to shuttle valve 29. When air tank 21 higher air, pressure flows to shuttle valve 29 higher air pressure closes off 1st. solenoid 28. Higher air pressure from air tank 21 passes through 2nd. solenoid 28E and shuttle valve 29 to air cylinder 34 extendible rod 33 with fork 44A to apply higher air pressure to towed vehicle's brake pedal 31 to stop towed vehicle very rapidly.

Towed vehicle will not move until safety pin 16 with cable and hook 18 are retrieved and reinserted in breakaway switch 13. Power from breakaway switch 13 to 2nd solenoid 28E ceases and 2nd solenoid 28E will exhaust air pressure from air cylinder 34 to the atmosphere through exhaust port 17 on 2nd solenoid 28E permitting extendible rod 33 to release brakes of towed vehicle for normal use of towed vehicle.

FIG. 3 Air Cylinder Assembly

Air cylinder 34 is stainless steel with port fitting 30 that will accept flexible conduit 22 to be attached from shuttle valve 29 which passes air from compressor 10, air tank 21, pressure regulator 26, flow valve 26, safety relief valve 27 and 1st. solenoid 28 for normal braking or directly from air tank 21 to 2nd. solenoid 28E and shuttle valve 29 for emergency braking. The front or brake pedal 31 end of air cylinder's 34 internal extendible rod 33 with fork 44A is held in place by removable anchor pin 45 (1 of 3) to brake pedal bracket 32 which is fastened to brake pedal 31 with bolts and wing nuts 43. The opposite end of air cylinder 34 has an attached bracket 46 held in place by a lock nut 47. This bracket 46 is attached with two bolts 36 to an adjustable link 37 with several holes to allow linear distance between vertical mount 38 and brake pedal 31 mount to be varied as necessary for different vehicles. Vertical mount 38 is held to fork 44B on adjustable link 37 by removable anchor pin 45

(1 of 3). Vertical mount 38 sets in a slot on permanently mounted floor bracket 39 and held in place by removable anchor pin 45 (1 of 3). Permanent floor mount 39 is bolted to reinforcing backup plate 42 with four bolts 36. These bolts anchor floor mount 39 and reinforcing plate through carpet 40 and vehicle floor 41.

What is claimed is:

1. A braking system in a towed vehicle that applies the brakes of said towed vehicle when brakes of a towing vehicle are applied and also provides emergency braking of said towed vehicle in the event of accidental disengagement of said towed and towing vehicles when traveling on a roadway the system comprising:

(a) a self contained unit that is adapted to be placed in the said towed vehicle, the unit comprising of a combination of a floor mount, a power cord which sends power to a compressor which produces air pressure to a pressure regulator, whereby said pressure regulator sends controlled air pressure to a flow control valve which controls the force of said controlled air pressure to a first solenoid valve, whereby said first solenoid valve sends said controlled air pressure to a shuttle valve, whereby said shuttle valve sends said controlled air pressure to an air cylinder and whereby said air cylinder presses a brake pedal of said towed vehicle assisting in slowing and or stopping towed and towing vehicles;

(b) a flexible cable with a hook whereby said flexible cable with said hook is pulled from a breakaway switch to activate a second solenoid valve.

2. The braking system of claim 1 whereby said shuttle valve changes from said controlled air pressure to send said air pressure to said air cylinder attached to said towed vehicle's brake pedal beg said towed vehicle to a rapid controlled stop after disengagement from said towing vehicle while traveling on a roadway.

* * * * *